E. WOODWARD, DEC'D.
E. MILLETT, EXECUTRIX.
CLUTCH.
APPLICATION FILED NOV. 1, 1909.
1,167,870.
Patented Jan. 11, 1916.
2 SHEETS—SHEET 2.
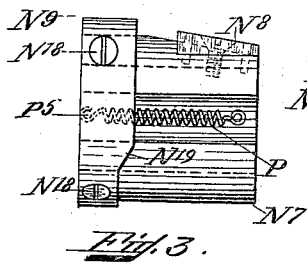
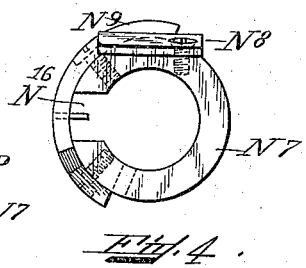
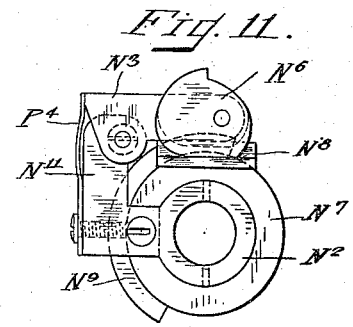
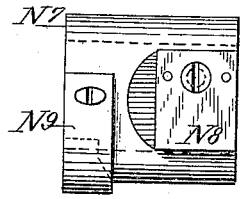
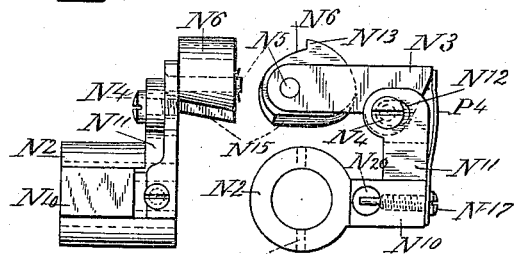
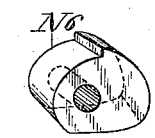
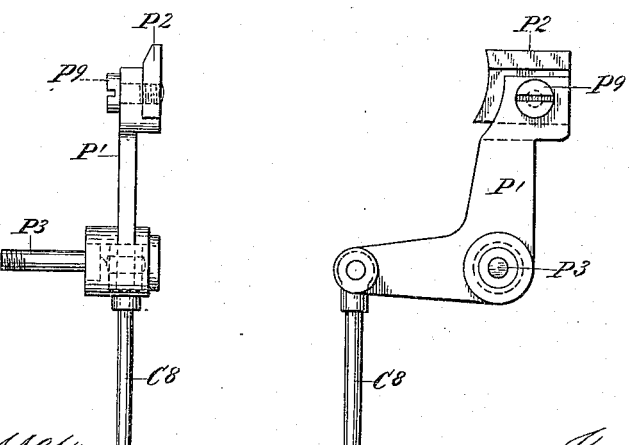

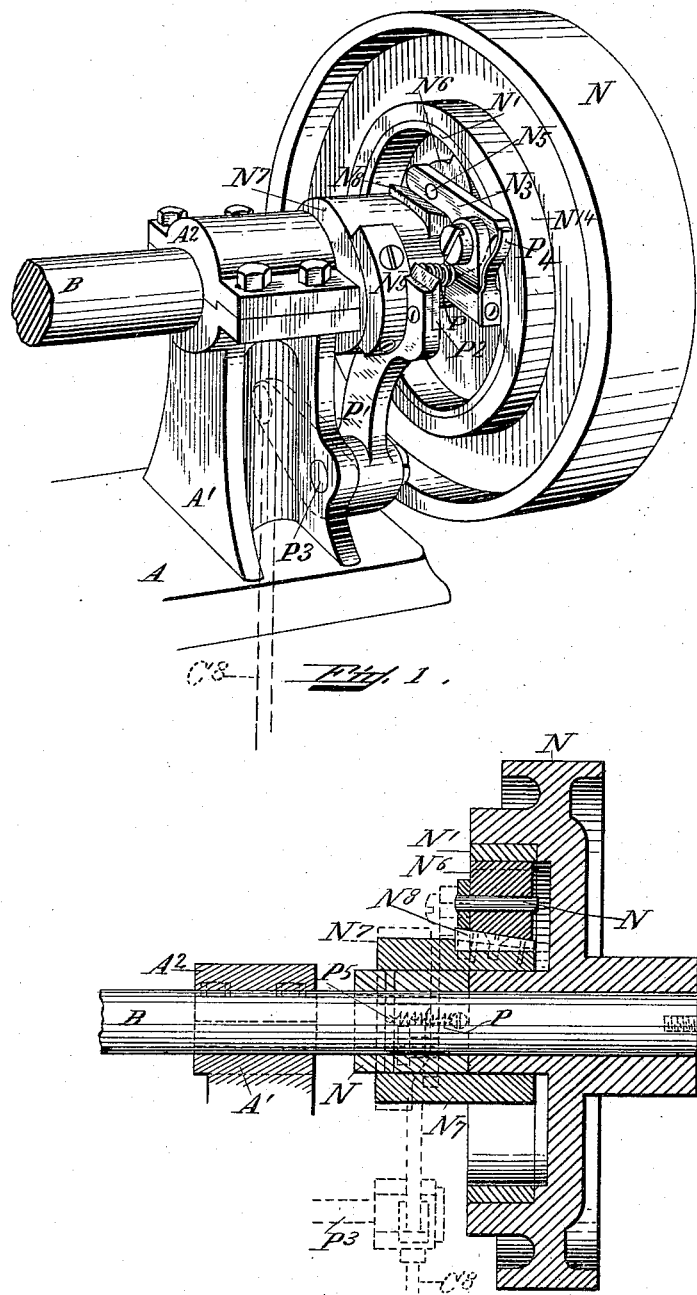

UNITED STATES PATENT OFFICE.

ERASTUS WOODWARD, OF SOMERVILLE, MASSACHUSETTS; ELMINA MILLETT, EXECUTRIX OF SAID WOODWARD, DECEASED, ASSIGNOR, BY MESNE ASSIGNMENTS, OF ONE-HALF TO JOHN J. SHEEHAN AND ONE-HALF TO WILLIAM P. EGAN, BOTH OF LYNN, MASSACHUSETTS.

CLUTCH.

1,167,870.   Specification of Letters Patent.   Patented Jan. 11, 1916.

Application filed November 1, 1909. Serial No. 525,672.

*To all whom it may concern:*

Be it known that I, ERASTUS WOODWARD, of Somerville, in the county of Middlesex and State of Massachusetts, have invented certain new and useful Improvements in Clutches, of which the following is a specification.

This invention relates to improvements in clutches and its object is to simplify the construction and produce a more positive and quicker action of the frictional movement in connecting or disconnecting the same.

In the accompanying drawings which illustrate a construction embodying my invention, Figure 1 is a perspective view of the device showing the parts in disconnected or non-operating position; Fig. 2 is a central longitudinal sectional view of Fig. 1; Fig. 3 is a side elevation of the sliding wedge; Fig. 4 is an end view; Fig. 5 is a top plan of Fig. 3; Fig. 6 is a side view of the friction roll and holder; Fig. 7 is an end view of the same; Fig. 8 is a detail view of the friction roll; Figs. 9 and 10 are respectively side and end views of the clutch mechanism. Fig. 11 is a transverse sectional view hereinafter described.

Like letters of reference refer to like parts throughout the several views.

B represents a portion of the driving shaft which is rotatably mounted in the bearing $A^2$ in the upper part of the post $A'$ of the bed plate A.

N is a driving pulley mounted on the outer end of the shaft B and is adapted to normally freely rotate thereon, said pulley being held in position by a washer $B^2$ secured to the end of shaft B by a suitable screw $B^3$. The sleeve or holder $N^2$ (see Figs. 6 and 7) is mounted upon and pinned to shaft B and carries an extension $N^{10}$ having a vertically disposed arm $N^{11}$ projecting therefrom. A lever $N^3$ carries at one end a pin or shoulder screw $N^4$ which is movable in a slot $N^{12}$ in the upper end of arm $N^{11}$, said lever $N^3$ carrying on its opposite end the friction roll $N^6$ pivoted on pin $N^5$. This roll $N^6$ carries a dog $N^{13}$ on its upper side which is adapted to normally remain adjacent to but out of frictional contact with the inside periphery of the steel bushing $N'$ secured within the hub $N^{14}$ of pulley N. The lower face of roll $N^6$ is beveled at $N^{15}$ and is adapted to rest upon and be actuated by a sliding movement of the beveled wedge plate $N^8$ in one direction to lift said roll $N^6$ and engage the dog $N^{13}$ in frictional contact with bushing $N'$. The wedge plate $N^8$ is suitably secured to a sliding sleeve $N^7$ which is mounted over the fixed sleeve $N^2$ and is prevented from rotating thereon by the extension $N^{10}$ on said fixed sleeve $N^2$ being mounted within the recess $N^{16}$ and engaging with the said sleeve $N^7$. A spring P is secured at one end by a pin $P^5$ to the sliding sleeve $N^7$ and at its opposite end is secured within the recess $N^{20}$ in the extension $N^{10}$ of the fixed sleeve $N^2$ and secured therein by the projecting end $N^{18}$ of a screw $N^{17}$. This screw $N^{17}$ also secures one end of a flat spring $P^4$, the free end of which rests against one end of lever $N^3$. A cam strip $N^9$ is secured by screws $N^{18}$ to the sliding sleeve $N^7$, the inner face of said cam strip normally engaging with a switch plate $P^2$ secured by the screw $P^9$ to the upper arm of a bell-crank lever $P'$. This lever $P'$ is pivoted at $P^3$ to the lower part of the post $A'$, the lower arm of said lever $P'$ being pivotally connected with a rod $C^8$ which may be operated by a treadle or any other suitable means for operating the switch plate $P^2$ to release the sliding sleeve $N^7$.

With the parts in the position shown in Fig. 1, the driving shaft B is stationary and the driving pulley N is assumed to be continuously driven by any suitable power and running free upon the end of the driving shaft B. To connect the driving shaft with the pulley to start the same into operation, the operator presses the treadle or other device which is connected with the rod $C^8$, throwing said rod upward and moving the switch plate $P^2$ on the upper end of the bell-crank lever $P'$ out of contact with the cam strip $N^9$. The spring P immediately moves the sliding sleeve $N^7$ toward the pulley N forcing the beveled wedge plate $N^8$ against the beveled lower surface $N^{15}$ of the roll $N^6$ forcing the same upward until the dog $N^{13}$ engages the inner periphery of the bushing $N'$. The roll $N^6$ now being wedged between the bushing $N'$ and the beveled wedge plate $N^8$ acts through the sliding sleeve $N^7$ and extension $N^{10}$ to drive the shaft B in the required direction. As long as the switch plate $P^2$ is held out of contact with the cam strip $N^9$ by the operator pressing on the treadle, the shaft B will continue to revolve, but when the treadle is released the switch plate P² will fall into its normal position against the inner face of the cam strip N⁹, and when the sliding sleeve N⁷ is rotated sufficiently, the extended portion N¹⁹ of the cam strip N⁹ will engage with the switch plate P² causing the sleeve N⁷ to be moved outwardly against the tension of the spring P. This outward movement causes the beveled wedge plate N⁸ to slide away from the beveled face N¹⁵ of the roll N⁶ causing the same to drop slightly withdrawing the dog N¹³ out of frictional engagement with the bushing N'. The driving shaft B now stops with the extended portion N¹⁹ of the cam strip N⁹ resting against the switch plate P² and the pulley N will run idle upon the outer end of the shaft B. The slot N¹² permits a limited movement in a straight line of the lever N³ and the roll N⁶ against the tension of the spring P⁴ so that the harder the pulley pulls, the more the dog N¹³ wedges against the inner periphery of the bushing N'. The relation of the faces of the wedge plate N⁸ and the inner periphery of the bushing N' is such that the pull of the driving pulley N causes the friction roll N⁶ to wedge between said surfaces thereby forcing the dog N¹³ to a locking position in engagement with the bushing N' and the plate N⁸. This movement is permitted by the slot N¹² and spring P⁴. The spring P⁴ operates when the wedge plate N⁸ is withdrawn from the roll N⁶ to return said roll to its normal position.

Having thus described the nature of my invention and set forth a construction embodying the same, what I claim as new and desire to secure by Letters Patent of the United States is—

1. In a clutch mechanism, a driving pulley, a shaft adapted to be connected to and disconnected from said pulley, a sliding wedge mounted around said shaft, a gripping member adapted to coöperate with said sliding wedge and said pulley, mechanism adapted to control said sliding wedge whereby said gripping member is held out of engagement with said pulley, and automatic mechanism for operating said sliding wedge to engage said gripping member with said pulley after the operation of said controlling mechanism.

2. In a clutch mechanism, a driving pulley, a shaft adapted to be connected to and disconnected from said pulley, an engaging roll, a sliding wedge mounted on said shaft and adapted to operate said roll, mechanism adapted to control and normally hold said sliding wedge in non-operating position, and automatic mechanism for operating said sliding wedge to engage said roll with said pulley after the operation of said controlling mechanism.

3. In a clutch mechanism, a driving pulley, a shaft adapted to be connected to and disconnected from said pulley, a sliding wedge connected with said shaft, a dog adapted to be operated by said sliding wedge to engage said pulley, mechanism adapted to control and normally hold said sliding wedge in non-operating position, and automatic mechanism for operating said sliding wedge to engage said dog with said pulley after the operation of said controlling mechanism.

4. In a clutch mechanism, a driving pulley, a shaft adapted to be connected to and disconnected from said pulley, a sliding wedge connected with said shaft, a dog adapted to engage said pulley and having a beveled face coöperating with said sliding wedge and adapted to be operated thereby, mechanism adapted to control and normally hold said sliding wedge in non-operating position, and automatic mechanism for operating said sliding wedge to engage said dog with said pulley after the operation of said controlling means.

5. In a clutch mechanism, a driving pulley, a shaft adapted to be connected to and disconnected from said pulley, an engaging roll, a sliding wedge mounted on said shaft and adapted to operate said roll, a holder for maintaining said roll in position on said sliding wedge, mechanism adapted to control and normally hold said sliding wedge in non-operating position, and automatic mechanism for operating said sliding wedge to engage said roll with said pulley after the operation of said controlling mechanism.

6. In a clutch mechanism, a driving pulley, a shaft adapted to be connected to and disconnected from said pulley, an engaging roll, a sliding wedge mounted on said shaft and adapted to operate said roll, a holder for maintaining said roll in position on said sliding wedge, mechanism adapted to control and normally hold said sliding wedge in non-operating position, automatic mechanism for operating said sliding wedge to engage said roll with said pulley after the operation of said controlling mechanism, and yielding means in said holder for permitting a wedging movement of said roll between said sliding wedge and said pulley.

7. In a clutch mechanism, a driving pulley, a shaft adapted to be connected to and disconnected from said pulley, a sliding wedge connected with said shaft, a dog adapted to engage said pulley and having a beveled face adapted to coöperate with said sliding wedge, a yielding holder for maintaining said dog in position on said sliding wedge and adapted to permit a wedging movement of said dog between said wedge and said pulley when said dog is thrown into engagement with said pulley, mechanism adapted to control and normally hold said sliding wedge in inoperative position, and automatic mechanism for operating said sliding wedge to engage said dog with said pulley after the operation of said controlling mechanism.

8. In a clutch mechanism, a driving pulley, a shaft adapted to be connected to and disconnected from said pulley, a sliding wedge mounted around said shaft, a gripping member adapted to coöperate with said sliding wedge and said pulley, means adapted to normally control said sliding wedge whereby said gripping member is held out of engagement with said pulley and to be operated to release said sliding wedge, and automatic mechanism for operating said sliding wedge to engage said gripping member with said pulley after the release of said sliding wedge.

In testimony whereof, I have signed my name to this specification in the presence of two subscribing witnesses, this twenty-second day of October, A. D. 1909.

ERASTUS WOODWARD.

Witnesses:
A. L. MESSER,
L. G. BARTLETT.

Copies of this patent may be obtained for five cents each, by addressing the "Commissioner of Patents, Washington, D. C."